United States Patent [19]
Nelson

[11] Patent Number: 5,283,569
[45] Date of Patent: Feb. 1, 1994

[54] FLOAT ACTUATED FLOOD WARNING SYSTEM WITH REMOTE TELEPHONE REPORTING

[75] Inventor: Mark E. Nelson, Omaha, Nebr.

[73] Assignee: U.S. Army Corps of Engineers, Fort Belvoir, Va.

[21] Appl. No.: 913,768

[22] Filed: Jun. 30, 1992

Related U.S. Application Data

[63] Continuation of Ser. No. 450,969, Dec. 15, 1989, abandoned.

[51] Int. Cl.[5] ............................................. G08B 21/00
[52] U.S. Cl. ................................... 340/623; 340/624; 379/106; 73/311
[58] Field of Search ............... 340/620, 624, 625, 623, 340/601, 602; 73/311, 313, 305-307, 314-316, 171; 116/110, 228; 200/84 R, 84 A, 84 B, 84 C; 379/40-42, 106

[56] References Cited

U.S. PATENT DOCUMENTS

| | | | |
|---|---|---|---|
| 1,588,877 | 1/1926 | Donahue | 73/311 |
| 3,861,212 | 1/1975 | Henry | 340/620 |
| 4,083,657 | 4/1978 | Misener | 73/304 R |
| 4,153,881 | 5/1979 | Permut et al. | 73/304 R |
| 4,228,427 | 10/1980 | Niedermeyer | 340/623 |
| 4,713,837 | 12/1987 | Gordon | 379/106 |
| 4,800,372 | 1/1989 | Poteet | 340/625 |
| 4,823,280 | 4/1989 | Mailandt et al. | 379/106 |
| 4,879,545 | 11/1989 | Aquilar | 340/624 |

FOREIGN PATENT DOCUMENTS 0017876  2/1977  Japan ..................................... 73/171

Primary Examiner—Edward L. Coles, Sr.
Assistant Examiner—Jill Jackson
Attorney, Agent, or Firm—Luther A. Marsh

[57] ABSTRACT

A flood warning system including a stilling well having three vertically spaced apart float switches therein for detecting the level of flood waters. Upon the water level reaching and closing the lowest float switch, a telephone alarm dialer is actuated to transmit a first low stage flood warning message to a remote location. Upon the water level reaching and closing the second or middle level float switch, the lowest float switch is disabled and the upper float switch is enabled. Upon the water reaching and closing the upper float switch the telephone alarm dialer is actuated to transmit a high stage flood warning message to the remote location. As the water recedes, upon dropping below and opening the middle level float switch the lowest float switch is enabled and the upper float switch is disabled thereby actuating the telephone alarm dialer to transmit a second low stage flood warning message to the remote location. This second low stage flood warning message indicates that the flood has crested.

4 Claims, 3 Drawing Sheets

FLOAT ACTUATED FLOOD WARNING SYSTEM WITH REMOTE TELEPHONE REPORTING

This is a continuation of application Ser. No. 450,969, filed 15 December 1989, now abandoned.

BACKGROUND OF THE INVENTION

1. Field of the Invention

The invention relates to flood warning systems and more particularly the such systems providing a low stage flood alarm, a high stage flood alarm and an alarm indicating that the flood has crested.

2. Description of the Prior Art

In the past an Alert-type flood warning system was used to provide flood warning to both large and small communities. Such Alert-type flood warning systems included a base station, having a microcomputer using Alert flood forecasting software, linked by radio to remotely located rain and stream stage gages. The remote rain gages recorded the rainfall amount by the tipping bucket method and an alarm was transmitted when a threshold amount or intensity was reached. The stream gages detected a threshold rate of rise or level of water and an alarm was transmitted when that threshold was reached.

In general, such Alert-type flood warning systems have worked adequately for large communities capable of supporting an adequate staff of technically trained personnel to keep the equipment operational. However, for those smaller communities not able to support a staff of technicians and engineers prior art flood warning systems were not practical leaving such communities without a flood warning system.

SUMMARY OF THE INVENTION

The invention provides a low cost, easy to maintain and operate flood warning system for providing advance warning to communities of impending floods by signaling the arrival of high water at locations in the basin upstream from the community. In particular, the invention includes a stilling well having three vertically spaced apart float switches therein for detecting the level of flood waters. Upon the water level reaching and closing the lowest level float switch, a telephone alarm dialer is actuated to transmit a first low stage flood warning message to a remote location over a telephone line. Upon the water level reaching and closing the second or middle level float switch, the lowest level float switch is disabled and the upper level float switch is enabled. Upon the water reaching and closing the upper level float switch the telephone alarm dialer is actuated to transmit a high stage flood warning message to the remote location. As the water recedes, upon dropping below and opening the middle level float switch the lowest level float switch is enabled and the upper level float switch is disabled thereby actuating the telephone alarm dialer to transmit a second low stage flood warning message to the remote location. This second low stage flood warning message indicates that the flood has crested.

DESCRIPTION OF THE PREFERRED EMBODIMENT

Figure 1:
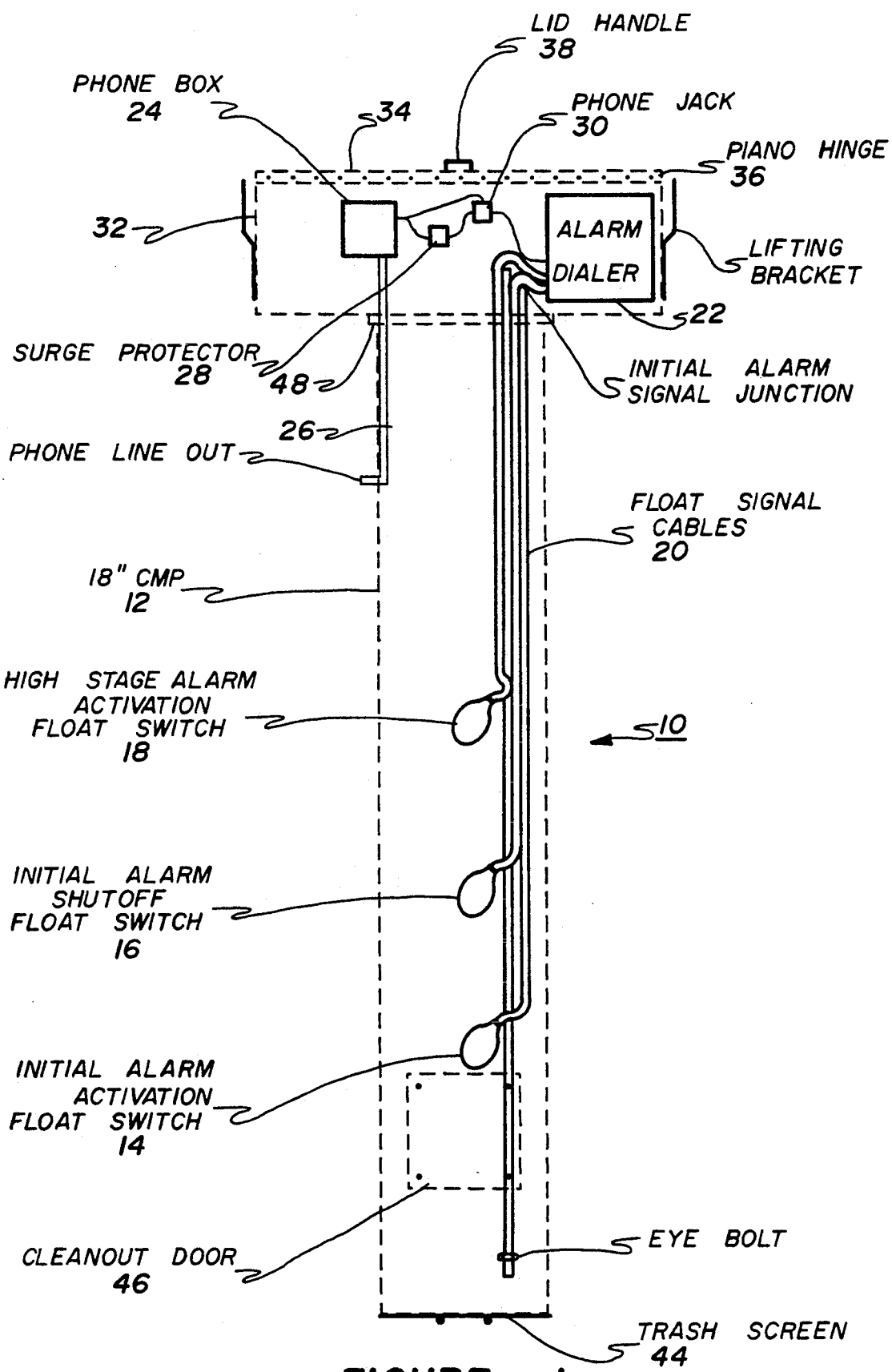
FIG. 1 illustrates a first embodiment of the invention.

Referring to the drawings and particularly to FIG. 1, the flood warning system 10 includes a stilling well 12 having mounted therein a lowest level float switch 14, a middle level float switch 16 and a high level float switch 18. The float switches are connected by cables 20 to alarm dialer 22.

The float switches 14, 16 and 18 operate using a mercury switch encased in a float. When the water level rises, the float tips and closes the switch, which trips the alarm or in this case activates the automatic dialer. Such float switches have been used for years in sewage treatment plants to warn of pump failure so they have proven that they can operate in harsh environments. Such float switches are manufactured by the Consolidated Electric Company as a Model LS Direct Acting Float Switch.

Alarm dialer 22 is a two channel tape dialer that actuates phone 24 to transmit prerecorded flood warning messages over phone line 26 to a remote location such as a central station. Alarm dialer 22 is connected to phone 24 through phone jack 30. Surge protection device 28 is provided between alarm dialer 22 and phone 24 to protect the equipment against voltage spikes that may be created by lightning.

The alarm dialer 22 may be implemented with an Ademco Model No. 612 Automatic Telephone Dialer. The alarm dialer 22 features a switch activated telephone dialout apparatus that plays a recorded taped message to one or more phone numbers. Two switch channels are provided, allowing separate alarms for two different gage heights. At least four different phone numbers can be assigned to alarm dialer 22. The alarm dialer 22 is designed to operate in harsh environments and is powered by a six volt rechargeable battery.

Alarm dialer 22, phone 24, jack 30 and surge protector 28 are contained in weather proof instrument shelter box 32 which is mounted on top of stilling well 12 to provide a weather proof cover for stilling well 12. Shelter box 32 is provided with a cover 34 pivotally mounted to shelter box 32 by hinge 36. Cover 34 may be removed by pulling upwardly on handle 38. Appropriate seals (not shown) are provided to seal the interior of shelter box 32 from the elements.

Figure 2:
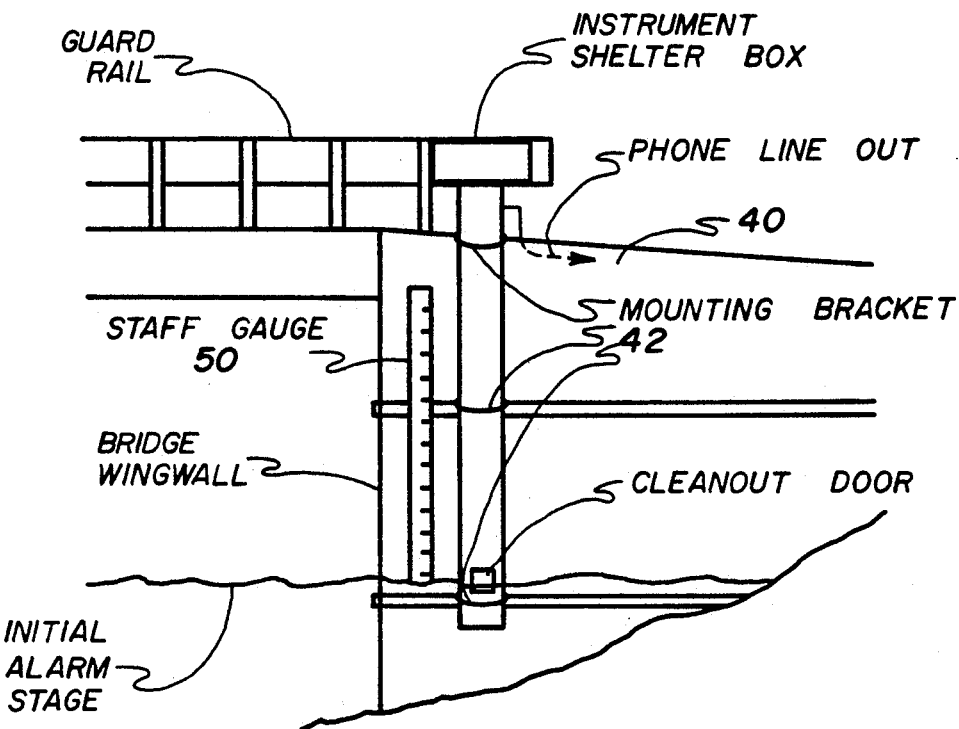
FIG. 2 illustrates the placement of the embodiment shown in FIG. 1.

Stilling well 12 is mounted to a bridge structure 40 or other hydraulic structure by means of mounting brackets 42 as shown in FIG. 2. Adjacent the lower end of stilling well 12 is a cleanout door opening 46. The lower opening of stilling well 12 is covered with trash screen 44 to allow the stilling ell 12 to fill with water while keeping trash out. Stilling well 12 may be fabricated from 18 inch CMP and may be joined to shelter box 32 by pipe collar 48.

As shown in FIG. 2, staff gage 50 is provided for visual confirmation of flood warnings. Staff gage 50 may be located adjacent stilling well 12 and provided with the same datum as the float switches 14, 16 and 18.

Alarm dialer 22 is a tape recorder style tape dialer programmer used to program the prerecorded flood warning messages that are transmitted via phone 24 over phone line 26 to a local telephone network.

The operation of the alarm system of FIG. 1 is as follows. When the water rises to the level of the lowest float switch 14, the initial alarm circuit is closed, thereby actuating alarm dialer 22 to place one or more calls to the community at risk. A message identifying the warning system 10, its location and the alarm level is transmitted to the recipient of the call. This message is called the low stage flood warning message. The recipient is instructed to note the time the message was received. Preferably the alarm dialer 22 plays each message three times and resets. Of course alarm dialer 22 may be set to repeat the message as many times as desired. As long as the water level remains above the float switch it will not reactivate. However, the alarm dialer 22 will reactivate if the water level falls below the float switch level and rises again. Once the tape finishes the alarm stops.

When the water level reaches the middle level float switch 16, the lowest level float switch 14 circuit is opened thereby disabling lowest level float switch 14 and the upper level float switch 18 circuit is closed thereby enabling the upper level float switch 18.

When the water level reaches upper level float switch 18, the high stage alarm circuit is closed actuating alarm dialer 22 to place one or more calls to the community at risk. A message identifying the warning system 10, its location and the alarm level is transmitted to the recipient of the call. This message is called the high stage flood warning message. The recipient is instructed to note the time the message was received. Once the tape finishes the alarm stops.

As the water recedes, a second low stage alarm message is transmitted when the water drops below the level of the middle level float switch 16 enabling and actuating the initial alarm circuit. This second low stage alarm message indicates that the flood has crested and that the water is receding.

The location of the individual flood warning gages 10 and the location of the float level switches 14, 16 and 18 in the stilling well 12 are determined using a hydrologic model run on a computer. Hydrographs are developed and routed through the basin for storms of various return intervals. Flood warning times are developed for the community at risk, based upon modeled storms. The float switch elevations are preset, based upon channel hydraulics at the site and the rate of rise for extreme flood levels. Given the time between the initial alarm and the high stage alarm, the gage locations and the tables from the hydrologic model, the community can calculate the severity of the approaching flood and its time of arrival.

When the first low stage flood warning message is received by designated community officials, the community response plan is set into motion. A command center is manned which has a CB radio and at least two phone lines, one of which is dedicated to receiving further flood messages. Rainfall observers, located upstream in the basin are polled for rainfall amounts. An observation party with a CB radio is dispatched to the alarm gage site to read the staff gages. Based upon the time between low and high stage alarms, the location of the gages reporting, rainfall reports from the observers and flood reports from the observation party, the flood response coordinator determines the action to take.

The present invention provides a flood warning system particularly applicable to small communities as opposed to the Alert-type flood warning systems, because the present invention does not require a computer or electronics expert to operate and maintain the system.

Figure 4:
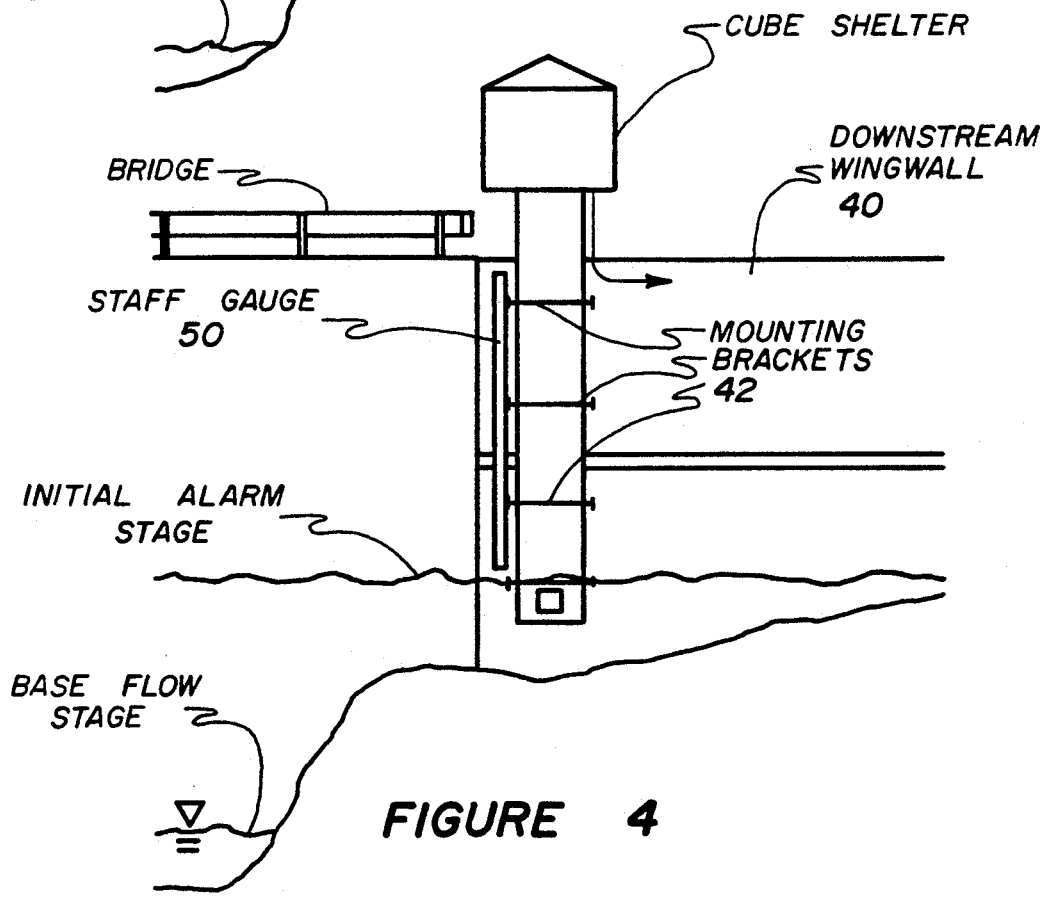
FIG. 4 illustrates the placement of the embodiment shown in FIG. 3.
Figure 3:
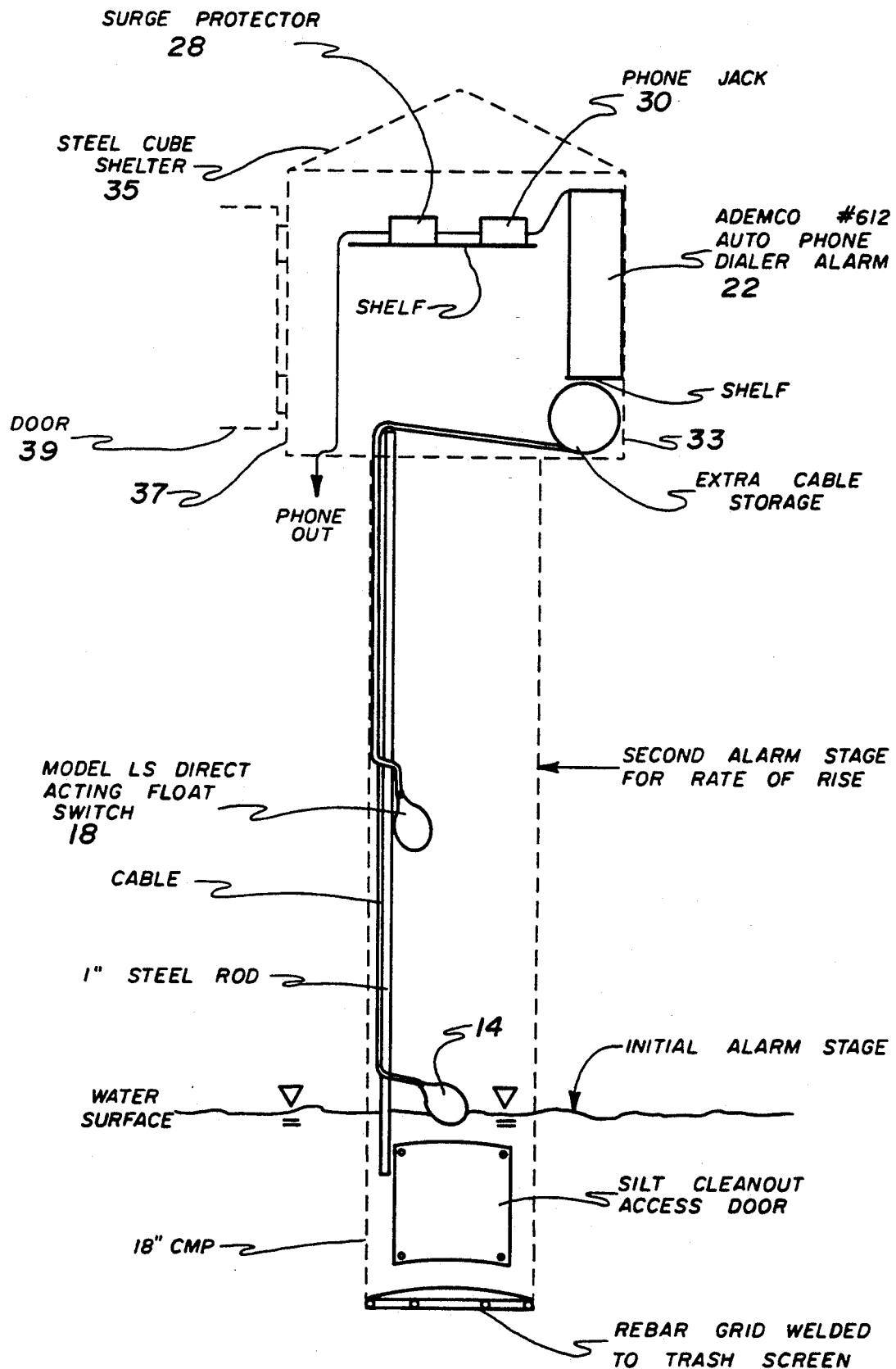
FIG. 3 illustrates a second embodiment of the invention.

Now turning to FIGS. 3 and 4 there is shown a second embodiment of the invention. The embodiment shown in FIG. 3 differs from the embodiment shown in FIG. 1 in two major respects. First, the embodiment of FIG. 3 includes only an lowest level float switch 14 and a high level float switch 18. Because there is no middle level float switch the alarm dialer 22 will not be activated as the water level recedes to provide an indication that the flood has crested. However, the float switches 14 and 18 in the embodiment of FIG. 3 will actuate the alarm dialer 22 to sent both a low stage flood warning message and a high stage flood warning message over the telephone line as the water level rises first above the float switch 14 and then above the float switch 18. Secondly, the housing 33 for the embodiment of FIG. 3 differs from the shelter box 32 shown in FIG. 1. The housing 33 includes a steel roof 35 supported by a circular vertical wall 37 having an opening therein with closure 39 pivotable attached thereto for providing a weather proof seal for the opening.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A flood warning apparatus comprising:
   a. water level detecting means for detecting rising and receding flood waters including, a first, second and third water level detecting means for detecting the water level at, respective, first, second and third elevations, wherein
      (1) said second water level detecting means, when actuated, enables said third level water detecting means and disables said first water level detecting means, and
      (2) said second water level detecting means, when not actuated, disables said third level water detecting means and enables said first water level detecting means; and
   b. message means, responsive to said water level detecting means, for providing flood warning messages to a remote location, including, in order as the water rises, crests and then falls, a first low stage flood warning message when the water level rises to said first elevation, a high stage flood warning message when the water level rises to said third elevation, and a second low stage flood warning message when the water level falls to said second elevation located between said third and said first elevation, said second low stage flood warning message indicating that the flood has crested, whereby both a low and high stage flood warning alarm is provided as well as an indication that the water level of the flood has crested.

2. The apparatus of claim 1 wherein said message means comprises:
   a. a phone including a phone line
   b. a tape dialer, responsive to said first, second and third water level detecting means, for actuating the phone to transmit the following prerecorded flood stage warning messages over a phone line to said remote location, said first low stage flood warning message, said high stage flood warning message, and said second low stage flood warning message.

3. The apparatus of claim 1 wherein said message means comprises:
   a. a phone including a phone line
   b. a tape dialer, responsive to said water level detecting means, for actuating the phone to transmit prerecorded said first and second low and said high flood stage warning messages over said phone line to said remote location.

4. A flood warning apparatus comprising:
   a. water level detecting means for detecting rising and receding flood water at least three elevations;
   b. message means, responsive to said water level detecting means for providing flood warning messages to a remote location, including, in order, as the water rises, crests and then falls, a first low stage flood warning message when the water level rises to a first elevation, a high stage flood warning message when the water rises to a third elevation, and a second low stage flood warning message when the water level falls to a second elevation located between said third and said first elevation, said second low stage flood warning messages indicates that the flood has crested, whereby both a low and high stage flood warning alarm is provided, as well as, an indication that the water level of the flood has crested; and whereby said water level detecting means further comprising:
   c. a first water level detecting means for detecting water at said first elevation;
   d. a second water level detecting means for detecting water at said second elevation; and
   e. a third water level detecting means for detecting water at said third elevation; and whereby further,
   f. said second water level detecting means upon being actuated enables said third level water detecting means and disables said first water level detecting means;
   g. said second water level detecting means before being actuated disables said third level water detecting means and enables said first water level detecting means; and
   h. said second water level detecting means enabling and actuating said first water detecting means upon the water level falling from above to below said second water level detecting means.

* * * * *